(No Model.)
H. M. DODGE.
FISHING APPARATUS.
No. 594,609. Patented Nov. 30, 1897.
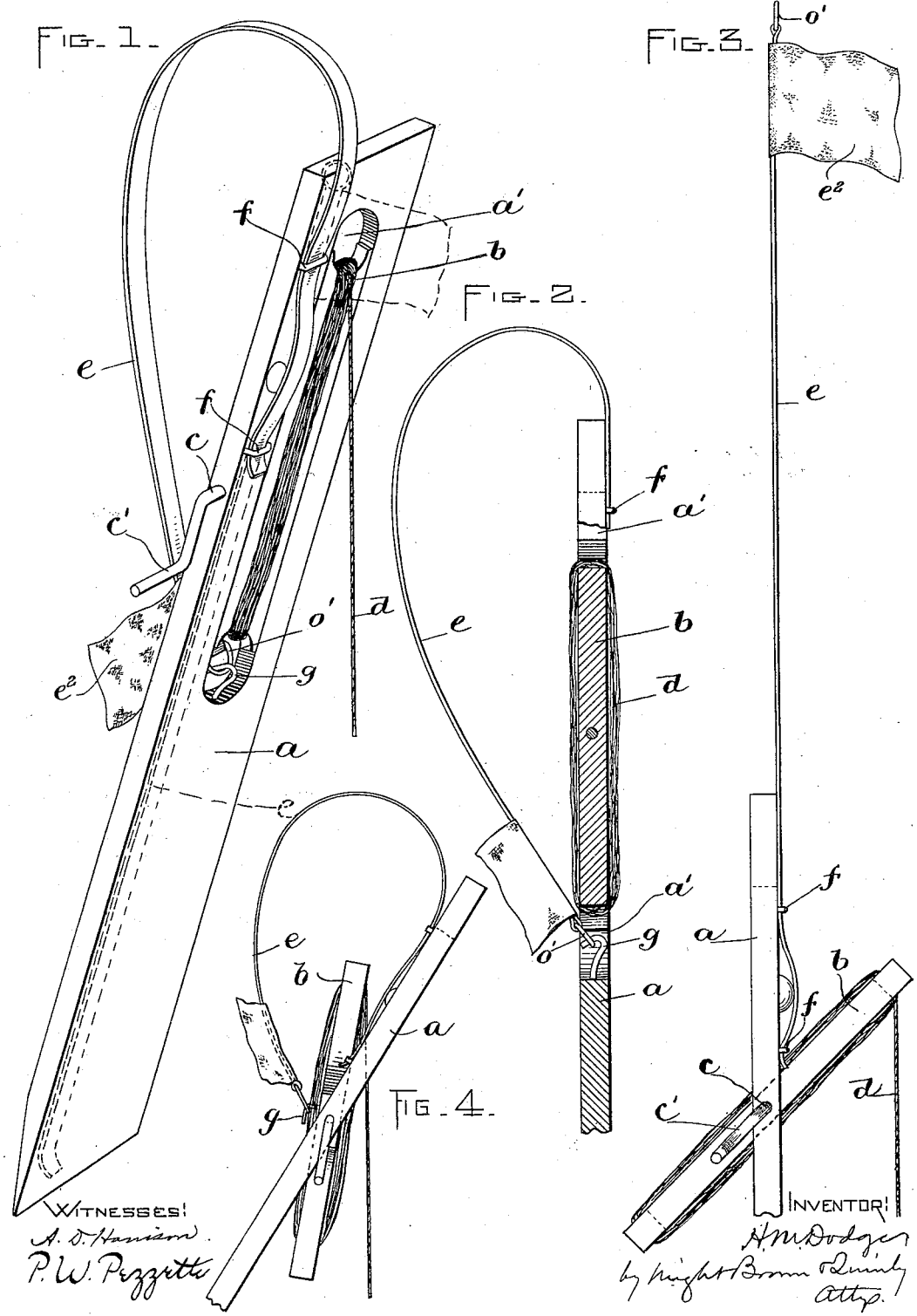
Witnesses:
A. O. Harrison
P. W. Pezzetti
Inventor:
H. M. Dodge
by Knight Brown & Quinby
Attys.

UNITED STATES PATENT OFFICE.

HENRY M. DODGE, OF BOSTON, MASSACHUSETTS.

FISHING APPARATUS.

SPECIFICATION forming part of Letters Patent No. 594,609, dated November 30, 1897.

Application filed January 20, 1897. Serial No. 619,910. (No model.)

*To all whom it may concern:*

Be it known that I, HENRY M. DODGE, of Boston, in the county of Suffolk and State of Massachusetts, have invented certain new and useful Improvements in Fishing Apparatus, of which the following is a specification.

This invention relates to appliances for fishing through a hole cut in ice, and particularly to that class of apparatus which comprises a movable signal arranged to be set in a concealed or inconspicuous position and released and thrown upwardly automatically when the fish bites the hook.

The invention has for its object to provide a simple and effective appliance of this class; and it consists in the improvements which I will now proceed to describe and claim.

Of the accompanying drawings, forming a part of this specification, Figure 1 represents a perspective view of my improved fishing apparatus ready for use. Fig. 2 represents a sectional view of the same. Fig. 3 represents an edge view showing the signal released. Fig. 4 represents a view similar to Fig. 2, showing a different arrangement of the detent and arm.

The same letters of reference indicate the same parts in all the figures.

In the drawings, $a$ represents a holder or support, which is an elongated strip of wood adapted to be inserted in a hole prepared for it in a body of ice. The holder $a$ is provided with a longitudinal slot $a'$ near its upper end, and in this slot is placed a reel $b$, which is rotatively connected to the holder by means of a shaft $c$, one end of which is bent to form a crank $c'$, the shaft being adapted to turn in bearings in the holder $a$ and rigidly secured to the reel $b$, so that the reel can be rotated by the shaft and crank to wind up the line $d$.

$e$ represents an elongated elastic metal signal or signal-holder, which is preferably a strip of spring-steel engaged with the holder $a$ by means of staples $f\ f$, driven into the holder, forming guides in which the strip $e$ is adapted to slide. The strip may be retracted or moved to the position shown by dotted lines in Fig. 1, its main portion then lying against the holder $a$, so that the whole device will be in compact form. When it is desired to make the signal operative, the strip $e$ is moved upwardly as far as the guides $f$ will permit, as shown by full lines in Fig. 1, and its upper end, which is provided with an eye or ring $e'$, is then carried over behind the holder and engaged with a hook or detent $g$, secured to the holder at the lower end of the slot $a'$. The strip $e$ near its lower end is provided with an outward bend or bow, which is adapted to be pressed inward when the strip is slid down and which springs out above the lower guide or staple $f$ when the strip is moved upward and is in the position shown in Figs. 3 and 1. Thus the lower end of the strip is held firmly whether the strip is straight or bent. The hook $g$ is so arranged that it holds the end of the strip $e$ in the path of the reel $b$ when the latter is rotated, so that when the reel is adjusted to the position shown in Figs. 1 and 2 and a pull is exerted on the line by a fish the resulting rotation of the reel will force its lower end backwardly against the strip $e$ and disengage the eye $e'$ from the detent $g$, whereupon the resilience of the strip $e$ will cause it to straighten and project above the holder $a$, as shown in Fig. 3, thus displaying a flag $e^2$, affixed to the upper end of the strip.

It will be seen that the apparatus is extremely simple and inexpensive in construction, there being no pivot or shaft for the arm and no spring other than the arm itself, prevents all liability of the line dropping upon the ice surrounding the hole, and enables the line to be readily wound up after use.

In Fig. 4 I show the detent $g$ secured to the reel at a point close to and just above the axis of the latter, the detent being so arranged relatively to the axis of the reel that the tension of the arm $e$ upon the detent when the arm is engaged therewith will yieldingly hold the reel and the detent in the position shown in Fig. 4, the detent being thus held in position to engage and prevent the escape of the arm. A pull upon the line will displace the reel from this position and swing the detent around the axis of the reel, causing it to release the arm, which will then assume its normal position.

I claim—

1. A fishing appliance comprising a holder or standard, an elastic signal-arm longitudinally movable in guides on the holder and adapted to be retracted and lie against the holder and to be projected therefrom while the guides firmly hold its lower end, a reel rotatively connected with the holder, and a detent adapted to engage the outer end of the elastic arm and hold said arm out of its normal position when projected, said detent and arm being arranged to be disconnected by a movement of the reel.

2. A fishing appliance comprising a holder or standard, an elastic signal-arm longitudinally movable in guides on the holder, an elongated reel rotatively connected with the holder, and a detent attached to the reel and adapted to engage the outer end of the arm, said detent being arranged in such relation to the axis of the reel that the tension of the arm will yieldingly hold the reel and detent in the arm-engaging position of the latter, a movement of the reel from said position causing the release of the arm by the detent.

In testimony whereof I have signed my name to this specification, in the presence of two subscribing witnesses, this 16th day of January, A. D. 1897.

HENRY M. DODGE.

Witnesses:
C. F. BROWN,
A. D. HARRISON.